United States Patent
Griffin et al.

(10) Patent No.: US 11,544,029 B2
(45) Date of Patent: Jan. 3, 2023

(54) SYSTEM AND METHOD FOR SYNCHRONIZED STREAMING OF A VIDEO-WALL

(71) Applicant: Userful Corportaion, Calgary (CA)

(72) Inventors: Timothy Elwood Griffin, Calgary (CA); Reza Razavi, Calgary (CA)

(73) Assignee: Userful Corporation

( * ) Notice: Subject to any disclaimer, the term of this patent is extended or adjusted under 35 U.S.C. 154(b) by 0 days.

(21) Appl. No.: 17/181,569

(22) Filed: Feb. 22, 2021

(65) Prior Publication Data
US 2021/0294558 A1 Sep. 23, 2021

Related U.S. Application Data

(60) Provisional application No. 62/980,026, filed on Feb. 21, 2020.

(51) Int. Cl.
*G06F 3/14* (2006.01)
*H04L 69/28* (2022.01)
*H04N 21/43* (2011.01)

(52) U.S. Cl.
CPC .......... *G06F 3/1446* (2013.01); *G06F 3/1431* (2013.01); *H04L 69/28* (2013.01); *H04N 21/4307* (2013.01)

(58) Field of Classification Search
CPC .... G06F 3/1446; G06F 3/1431; G06F 3/1423; G06F 3/1462; G06F 3/1454; H04L 69/28; H04N 21/4307; H04N 21/242; G09G 5/12; G09G 5/363; G09G 2300/026; G09G 2320/0252; G09G 2350/00; G09G 2356/00; G09G 2360/122; G09G 2370/022; G09G 2370/042
See application file for complete search history.

(56) References Cited

U.S. PATENT DOCUMENTS

| | | | |
|---|---|---|---|
| 11,169,760 B1 * | 11/2021 | Qi | G06F 3/1446 |
| 2018/0060014 A1 * | 3/2018 | Son | G06F 3/1431 |
| 2018/0068638 A1 * | 3/2018 | Ellis | G09G 5/12 |

* cited by examiner

*Primary Examiner* — Vijay Shankar
(74) *Attorney, Agent, or Firm* — Van Pelt, Yi & James LLP

(57) ABSTRACT

A system is disclosed for processing and streaming real-time graphics by a video-server for synchronized output via secondary-network connected display adapters to multiple displays arranged as a video-wall. This system enables the video-server to leverage performance advantages afforded by advanced GPUs, combined with low-cost Smart displays or System-on-Chip devices to deliver advanced realtime video-wall capabilities over the network while offering flexibility in the selection of network display adapters and still achieving synchronized output of multiple sub-image streams to selected end-point displays. This has applications generally in the field of real-time multiple-display graphics distribution as well as specific applications in the field of network video-walls. A method and computer readable medium are also disclosed that operate in accordance with the system.

20 Claims, 3 Drawing Sheets

SYSTEM AND METHOD FOR SYNCHRONIZED STREAMING OF A VIDEO-WALL

CROSS-REFERENCE TO RELATED APPLICATION

This application claims priority from the U.S. Provisional Patent Application No. 62/980,026 filed on Feb. 21, 2020, which is hereby incorporated by reference.

FIELD OF INVENTION

Large electronic displays may be formed from an array of digital displays referred to as a "video-wall". For example video-wall might be comprised of a 3×3 array of nine displays, each simultaneously displaying a portion of a single image, thereby creating the appearance of a single large display. It is generally desirable both to have full flexibility in the arrangement of displays, and the ability to update the displays with realtime content streamed over the network to the display. The present invention relates generally to improving the setup and operation of network addressable video-wall displays.

BACKGROUND OF THE INVENTION

The present invention relates generally to improving the setup and operation of video-wall displays and particularly to network addressable displays.

A video-wall display system is a method to overcome the costs of manufacturing and installing very large displays, by assembling a large display using multiple smaller displays arranged and working together. By dividing a single image sequence into multiple sub-image sequences and displaying the appropriate sub-images of the sequences in synchrony on the arranged display devices, a much larger display with higher resolution can be simulated.

Traditional video-wall methods involve the pre-processing of video files, transferring and storing these processed video files onto devices, and then time-syncing the playback of these separate video files (a method unable to deal with real-time content), or distributing the entire video file to all devices and having them individually render the whole file and playback the cropped relevant portion for their display (a method unable to deal with high-resolution content unless each network display adapters device has sufficient processing and network capabilities), and/or using traditional video cards connected to the video-server (which requires the video-server to be physically close to the video-wall or requires expensive proprietary and complex video extension systems). All of these conventional approaches have significant limitations therefore a new approach is desirable.

While the video pre-processing method is sufficient for some video-walls which do not need to respond to content changes in realtime, for example repeatedly playing the same looped content, for other video-walls such as those in control rooms or monitoring facilities where realtime video feeds or where human interaction with the video-wall is required or desired, realtime video processing is essential.

Although the method of transmitting an entire video file to each display adapter and having each one crop the content to suit their individual placements on a video wall does achieve realtime performance, it can be prohibitively expensive as communication bandwidth tends to scale with both the number of display adapters, and the total resolution of the video wall (as low-resolution video displayed on high-resolution video walls appears blocky and pixelated), which greatly increases communication costs. The costs of the individual display adapters also increase as each one is required to be able to decode, crop, and display a high-resolution video in realtime, requiring sophisticated onboard graphics capabilities. Those systems which do employ this method typically require the wall to be composed of a very simple arrangement of displays (typically a rectangular grid with each display in the same orientation) so as to reduce the calculations necessary for each adapter to determine its place in the wall and the corresponding section of the video file to display.

The costs of the display adapters in the above method can be reduced by having each display adapter write to multiple displays but this requires even more powerful graphics processing in the display adapters. Taken to its extreme, this method evolves into a single "display adapter" serving all the displays for a video wall, but at this point the "display adapter" is in reality a high-end video server containing multiple high-end video cards. In this method the graphical content to display is rendered by one or more Graphics Processing Units (GPUs) each of which then directly outputs to one or more attached displays. Hence this traditional approach to video-walls requires the video-server to house one physical video output (and attached display) for each display sub-section of the video-wall. The requirement for a physical video output limits both the size (number of potential attached screens) and the distance to the displays that can be achieved with a single video-server.

By employing a video-server which renders and transmits video information over a conventional network to low-cost, low-power, network-attached, minimal-complexity display adaptors it is possible to achieve improvements over traditional systems in terms of cost, design, maintenance, space-saving, reliability, and flexibility of the system as well as allowing for additional advanced functionality such as failover but it also introduces numerous technical challenges which are addressed by this invention.

This approach takes advantage of the ready availability of low-cost network display adapter devices (such as android TV devices) and smart displays (i.e., displays equipped with system-on-a-chip (SOC) devices and integrated network-interface-controllers (NICs)). These devices are low cost but have vastly reduced processing power, resolution, and expansion capabilities compared to a video-server. This invention makes it possible for a powerful video-server to be used in combination with these low-cost devices to create a synchronized video-wall. For example a video-server may be capable of rendering 8 k or 16 k output whereas a network display adaptor might only be capable of 1 k or 4 k resolution. The addition of a video-server allows dynamic changes in the source content (for example from live video feeds, or a user moving a mouse across a screen) to be rendered with minimal (e.g., undetectable to the human eye) time delay.

The network approach offers additional advantages:

If the electrical power draw of the network display adapters are sufficiently low, their needs can be met by Power-over-Ethernet (PoE), and such network display adapters do not need to have an independent power delivery system.

A network-based approach ensures that displays can be automatically switched to a back-up failover video-server and resume playing content in the event that the original video-server fails.

It allows a single video-server to simultaneously drive the playback of multiple video-walls in different locations (each video-wall could either play different content or show the same image in several rooms with negligible additional CPU usage).

The network approach enables smart displays to be used as video-wall network display adapters eliminating the cost of acquiring media players.

The general video-wall invention can be modified to allow both input source and output displays to be changed on the fly (enabling individual displays to be dynamically added into or removed from the video-wall without interrupting playback on other displays).

There is no physical or theoretical limit on the number of displays that can be in the video-wall or the maximum resolution of the video-wall.

To achieve a realtime network video-wall the following challenges must be met:

1. Aggressive stream compression (to achieve reasonable network transfer rates over wide-area or wireless networks and not consume inordinate amounts of limited bandwidth. In addition, the built-in NICs on many SOCs have limited bandwidth capabilities.)
2. Frame synchronization that accounts for both variation in network latency as well as varying video-decoding capabilities within the SOC devices.
3. Extremely efficient video-server software and encoding framework to enable the video-server to process all of the sub-image sequences of the video with sufficient speed to achieve no perceivable latency (required for interactive and realtime use-cases).

To achieve the needed levels of bandwidth reduction, redundant transmission of information must be reduced as much as is practical. While a video server could compress, encode, and individually transmit entire video streams to each component display adapter in a video wall (with that display adapter decoding and cropping the stream appropriately) this multiplies the required bandwidth of the network by the number of displays in the video wall. This could be alleviated by multicasting a single video stream, but many networks, including almost all wide-area networks, do not support multicast due to the many security challenges that multicast poses.

This method also has the attendant disadvantage of limiting the total effective video resolution of the video wall to the lowest maximum resolution of any display adapter in the wall, as each display adapter must be able to decode the full resolution of the stream. Many smart displays are limited to decoding videos of no higher resolution than they can directly display. They also tend to have very little ability to perform real-time, display-specific image modification (ie, rotation, keystoning, aspect correction) thus making these attractive features much more difficult to implement.

Whereas in the disclosed method, where a sequence of video frames is chopped into sub-image sequences and separately modified, encoded, and streamed, the total resolution is limited only by the capabilities of the much more powerful video-server. As well, sub-image sequences streamed to each display adapter thereby contain no more information than what that particular display adapter needs to display and thus it can easily be sent over WANs and secure networks, and requires much lower demands on the decoding and processing abilities of the network display adapters.

Synchronization poses one of the main challenges in this invention. Non-realtime video streaming is commonplace with internet services such as Netflix but these services tend to impose multi-second delays during transmission due to the nature of TCP/IP communications and the addition of buffering. In most video streaming applications where there is no synchronization, chopping, or realtime requirement, a few seconds of delay between the video-server and network display adapter is of no consequence, but this is not true of realtime video walls.

The first challenge in synchronization is to achieve sub-millisecond latency in the processing, chopping, and splitting of frames on the server. Here this can be achieved through the novel concept of doing all the decoding, extraction, modification, and re-encoding of the sub images by the video-server GPU thereby eliminating expensive memory copies between the CPU and GPU and taking advantage of the advanced image processing capabilities of modern GPUs. The second challenge is achieving the right encoding parameters (compression, bitrate) that are compatible with multiple network display adapters. Hence the encoding parameters (such as compression, bitrate, encoding method, framerate, etc.) must be optimized and compatible with both the speed and latency of the network connection between the video-server and multiple network display adapters, as well as the decoding capabilities of the network display adapters. The third challenge is ensuring that the streaming occurs in such a way that the network display adapters are able to play back the frames perfectly synchronized with optimized latency (to the devices and network conditions). This requires the unique configuration of both the video-server and the network display adapters. The network display adapters must maintain their own clocks synchronized with a network time service (typically a network time clock). In the preferred embodiment this would be via a standard time protocol such as Network Time Protocol (NTP), however many other options exist. In the preferred embodiment the video-server would also be synchronized to the same network time clock (thus mitigating the need for inter-clock adjustment calculations). The video-server must then also ensure all of the sub-image sequences are streamed with accompanying timing information (such as clock references, sub-sequence time stamps, and latency offset adjustments). The network display adapters, in addition to receiving and decoding the sub-image sequences, must also combine the timing information with their local information (such as their synchronized clocks) so as to output a given sub-image in synchrony with the display of all other scheduled sub-images on all other display adaptors. The mere inclusion of individual sub-image time stamps is insufficient to achieve this synchronization as additional latency has been incurred since the video was streamed by the server (including the sending, receiving, decoding, and output by the network display adapter), which must be taken into account. Additionally this latency can vary from adapter to adapter based on conditions on the network, system load on the network display adapter, etc.

Hence to ensure the network display adapter has sufficient time to output synchronously, latency compensation is required to adjust for the delays inherent in sending over the network, and the receiving, decoding and output by the network display adapters. This compensation can be applied within the system in multiple ways, several of which are described below, but additional methods and combinations thereof for applying this compensation are envisioned. The compensation could be applied by:

the network display adapter adding the latency offset to the sub-sequence time stamp to determine a modified display time,
the video-server adding the latency offset when writing the time stamp (before sending), setting a time difference in relation to network time between multiple network display adapters and the video-server (e.g., the video-server clock being set slower relative to network time, and/or the network display adapter's time being set faster than network time).

The cumulative desired latency compensation could be achieved by any one of these methods or a combination thereof.

In addition the necessary amount of latency compensation needed can be set to a maximum deemed sufficient for a given network and its current configuration, or it can be dynamically calculated from timing information sent back from the display adapters to the video server.

Traditional methods of synchronizing streaming video playback to network display adapter devices include sending a timing pulse to indicate the time to display the next frame, or the transmission of the frame to each device at a time calculated so as to be displayed at the moment of decoding. However, depending on network quality and any variation between network display adapters and the image sizes of the relative portions, such playback is typically not perfectly synchronized.

The most common way to achieve synchronization within a video-wall is to simply directly connect each display to the video-server (via multiple video outputs from multiple video cards within the video-server) this way the output process is fast enough that there is limited opportunity for any latency variation between different displays within the system. However this last approach means the displays must be within a display-cable length of the video-server and the number of displays is limited by the capacity of the video-server to accommodate additional video cards.

Software clocks running on different computers typically don't run at the exact same speed hence time drift frequently occurs even with identical hardware over time and can even change with temperature changes or as CPU clock speed changes to adapt to local conditions (power demand, processor load, etc). Hence achieving synchronized playback over an extended period requires some form of centralized clock. A network clock such as network time protocol (NTP) is one way to achieve this, however other methods of time synchronization over the network such as a heartbeat, or synchronized high-accuracy clocks are also envisioned.

The need for low-latency, low-bandwidth, and high speed image processing is also paramount and so the video-server offloads as much of this work to high-speed GPU devices as possible, including video decoding, cropping, modifying, and re-encoding the sub-images in a sequence. These modifications can include image rotation to match rotated displays, image warping to match curved displays or projected displays, size adjustments (as there is no point in sending an image to a display adapter that is larger than can be displayed), aspect ratio compensation (by adding borders, if need be), and even frame-rate adaptations (in the case that a sub-image contains the same or substantially the same image as the previously encoded image).

DESCRIPTION OF THE INVENTION

This networked video-wall invention efficiently splits the sequence of frames of a video source on-the-fly and distributes the resulting streams of compressed video sub-frames over the network to multiple listening display devices where the corresponding sub-frames of an original frame are all displayed in synchrony. The splitting is achieved by built-in algorithms that decode, parse, process, and re-encode each input frame into multiple sub-images for transmission and display. There is no theoretical limit on the size of the video-wall, and each display can be independently positioned and oriented (i.e. rotated) within the video-wall.

Because only the relevant portions of the image are being sent to each display, and each of the video streams are encoded for network transmission, the network bandwidth consumed can be minimized and the ultimate resolution of the video-wall is not constrained by network bandwidth or SOC resolution limitations.

The present disclosure discusses improvements to encoding, transmission, compression, and playback synchronization methods which aid in providing a multi-display video-wall using network display adapters (which can be locally or remotely connected) which can source content rendered to the video-server GPU from any host process (i.e. the operating system, the window manager, a specific application like a video player, etc.).

The information on the position, resolution, configuration and settings for each individual physical display forming a segment of the video-wall and how they relate to the video-wall canvas is stored in a computer readable medium. Using this information the video-server decodes a sequence of graphical images then processes them (including rendering, adding borders, adjusting aspect ratios, splitting, cropping, warping, and rotating them) so as to produce multiple sub-image sequences with each sub-image customized to the display requirements of its corresponding physical display within the video-wall. Once the sub-image is extracted it is then re-encoded into a compressed video frame (using a video encoding method such as h264 or mjpeg) and passed to a streaming module.

The streaming module is configured to encode the corresponding sub-image sequences each as separate network video streams but with carefully correlated sub-image durations and time stamps and sends them over a computer network (such as a standard TCP/IP network) to the individual network-connected display devices corresponding to the said display segments comprising the video-wall.

The network display adapters are configured to receive and synchronously output the received sub-image sequences to multiple displays arranged as a video-wall based on network clock time-stamps plus a specified latency compensation (to accommodate network conditions and network display adapter's decoder speed);

The display device in communication with the video-server, on receiving of said compressed video frame, decompresses and decodes the image and outputs it based on the timing information and offsets received, to the physical display using the settings supplied by the video-server. Together these multiple display devices re-create (and synchronously play back) the sub-image sequences of the original image rendered to the video-server framebuffer by outputting to the multiple displays arranged as a video-wall. The video-server processes the images in near real-time and the individual cropped and compressed video frames are all delivered by the video-server to the display device over the network in near real-time. In addition, total image resolution has not been limited, and bandwidth and network display adapter compute capabilities have been conserved by sending only the applicable compressed video data applicable to each individual display portion of the wall.

These requirements (imposed by network delivery) create computationally intensive demands on the video-server demanding the advanced video decoding, processing capabilities and application optimizations offered by advanced video-server GPUs. A network video-wall that utilizes the video-server CPU only, would be limited in terms of the number of displays that could be connected.

The video-server GPU (e.g., graphics card, video card) provides a single large rendering framebuffer (the GPU framebuffer) to the operating system, window manager, video player or application as if a single large resolution display were connected. Thus the operating system, desktop and all running applications are able take advantage of the hardware acceleration, video decoding capabilities, and any other optimizations offered by the GPU thus maintaining full performance of the graphics pipeline. The final rendered content is housed in the GPU framebuffer of the server's video card in GPU memory. Using the GPU enables full flexibility and performance for the system to deliver any content input to or generated by the GPU to be efficiently processed for output to the multiple displays.

Typically the video-server GPU framebuffer from which the CPU must read from is private and is designed to normally output directly to video signal processors (e.g. HDMI encoders) for output to directly-attached displays. Consequently these GPU framebuffers are optimized for writing rather than reading (hence read performance from a GPU framebuffer is typically much slower than write performance). Consequently, given the multitude of displays in a video-wall (each requiring cropping of its corresponding sub-image sequence), requiring the CPU to read directly from the GPU framebuffer for each of these (e.g., 25 times for a 5×5 video-wall) would be infeasible in a realtime situation. Additionally since many GPUs now include video encoding capabilities, this invention additionally performs both the cropping and the encoding of the video directly on the GPU. In this way data read from the GPU is the encoded (compressed) video file rather than the corresponding but much larger raw video framebuffer.

This method of separately extracting, processing, encoding, and streaming sub-image sequences of a larger video canvas has other applications such as allowing for situations where the sub-image sequences require different processing or warping (for example to appear visually consistent when projected onto a curved or distorted surface). Thus, in a situation where there are displays in the video wall that need differing amounts of image correction such as keystoning, the video-server could perform this additional processing on the sub-image sequence streams before being routed to the displays requiring it.

The speed with which the video-server can extract, process, and encode the sub-image sequences is of paramount concern. This should be as fast as possible, ideally consuming less than 1 ms per input frame or else in a multi-display system too much latency is introduced to achieve the perception of realtime performance. To achieve this, in one iteration of the invention, all processing and encoding is done directly on the GPU using custom GPU processing toolchains written using GPU programming tools (such as Nvidia CUDA or OpenCL).

Even given these GPU programming tools, the work required for splitting a framebuffer into multiple sub-image portions (particularly when there are advanced transformations such as rotation and warping required) can be computationally intensive. While these transformation operations can be optimized it still requires the transformations to be calculated and applied to each frame as each frame is processed to extract the sub-images. In one embodiment of the invention, a direct memory map is utilized to accelerate the required transformations to extract multiple sub-images from the framebuffer (for output to the multiple displays comprising the video-wall). Using this direct memory map method the transformation calculations only need to be performed once, the outcomes of these transformation calculations being stored in the memory map. This memory map specifies, for each output sub-image pixel the correct corresponding input pixels from the framebuffer (accounting for the various required transformations such as resizing, rotation, cropping, color space conversion, and anti-aliasing as appropriate). Thus the regions to be output (the sub-images) can undergo almost any imaginable rearrangement or transformation much more rapidly by application of the direct memory map than by performing separate transformation calculations.

When producing the timing information which accompanies the streams of sub-image sequences, we generally include a reference to the clock being used, a start time for the current input stream (relative to said clock), presentation time stamps for each sub-image (relative to the input stream start), frame durations, and a calculated latency offset. This offset will be either pre-calculated when the video-wall is created, or it will be dynamically calculated based on timing feedback from smart network endpoints or the display adapters themselves.

It is sometimes desirable to have multiple identically configured video-walls in various locations displaying the same video content. Sometimes these video-walls need to be synchronized with each other, and sometimes not (although the requirement for synchronization within a video wall is always present). As processing video-wall content and preparing it for output to individual displays can be computationally intensive, in one embodiment of the invention, video-server usage can be minimized by replicating exactly the same content across multiple identically configured video-walls. In one embodiment the video-server achieves this by processing the content and sending out the encoded video frames over the network via network broadcast. In this way the video rendering and splitting is performed just once on the source-video file in spite of having for example ten video-walls on the network each listening to and rendering this same network broadcast video stream and displaying it on the video-wall.

Similarly, it is sometimes desirable to render a single source on variously placed network displays, including video-walls, by a single video-server. Decoding of the source video file is performed once, but splitting, scaling and encoding for delivery to the various network displays are performed as required for each individual targeted independent display device or video-wall segment. Basically the video-server processes the source file then sends it simultaneously to multiple different sized secondary output displays (pre-optimizing the content).

Since video-walls are typically very prominently and publicly located any service interruption is highly visible. In one embodiment, in the event that the video-server streaming to the network display adapters fails, the network-connected network display adapters comprising the video-wall automatically connect to a backup video-server and resume playing content provided by the backup video-server.

In this embodiment placement coordinates for each display within the video-wall along with other video-wall settings required to resume playback (e.g., content mapping and settings, etc.) are stored in configuration files in advance on the backup video-server(s). These configuration files may include information such as the uniquely identifying information for each network display device (e.g., MAC address and/or serial number), the display settings (e.g. resolution), its position within the video-wall array (e.g., 1:3), its exact placement and rotation within the video-wall canvas (e.g., coordinates of the top left corner of the display within the video-wall canvas) etc.

In one embodiment of the invention, during a fail-over situation (when a network display device loses its connection to its video-server) it automatically tries to re-establish connection to the video-server.

In one embodiment, the predetermined fail-over/backup video-server pretends to be the original video-server (in one embodiment this is achieved by emulating the failed video-server's video-server name), consequently the network display devices do not need to be programmed with the IP address of multiple video-servers, they simply always ask for the same video-server, and the video-servers are smart enough to switch back and forth as to which devices they accept.

Playback can either be scheduled to begin once the first of the displays reaches the backup video-server or can be delayed until all network displays within the video-wall have connected to the backup video-server.

The invention also provides for additional embodiments as follows:

In one embodiment a hardware input source such as a video camera or a video capture card (ie, an HDMI capture card) is installed in the video-server as a way for the video-server to receive input video source content.

In one embodiment a soft input source such as an HTML URL, a remote desktop protocol, a network video stream designator, a digital signage stream designator, or a locally running application program is specified as the source of content for the video-wall. In each case an appropriate data retrieval method is applied to provide the input video source content.

In one embodiment a dummy user session is utilized (e.g., a virtual browser session running at the target resolution for the combined video-wall canvas, such as 3840 by 2160), to render content to a framebuffer on the video-server GPU, and then the video-server reads this changing graphical image data for its input content. Additionally, pre-recorded or live user-feedback (such as mouse-activity and key presses) can be sent to the dummy session to simulate or achieve realtime human interaction with the content.

In one embodiment the video-wall video-server communicates directly with the network display adapters over a wifi network (rather than for example using the wireless network router) using, for example, miracast or chromecast display protocols.

In one embodiment the displays comprising the video-wall are receiving their display signals from zero-client devices that are receiving the compressed images in communication with the video-wall video-server.

In one embodiment the individual network connected displays comprising the video-wall are receiving their display signals from System-On-a-Chip (SOC) devices running an operating system (e.g., the android operating system) and an application (e.g. a video playing application).

These SOC devices are in turn receiving the compressed images in communication with the video-wall video-server.

In one embodiment of the invention, additional subdivisions and cropping are being done by the network display adapter. Here the multiple sub-image sequences are being multicast over the network, and the network display adapters being configured to receive and decode the streamed sub-image sequences and further crop the sub-image sequence into even smaller sub-portions of the sub-image for output to one or more display devices, in accordance with the placement of those devices in the video wall.

In one embodiment where it is desirable to periodically or repeatedly output the same looped video content (either in addition to, or instead of, realtime content) the sub-image sequences of the repeated content can be stored locally on the network display adapters comprising the video wall. This could be stored as a file on the local storage accessible to the network display adapter. Thus this content could be played-back repeatedly without consuming processing power from the video-server or network bandwidth. Additionally, in the event of an outage of the video-server the network display adapter could switch automatically to playing this locally stored content.

In one embodiment where it is desirable to limit bandwidth or video-server compute as much as possible (ie, in very large video walls), reduction of the framerate, encoding fidelity, bit-rate, or color-depth of the streamed sub-images can greatly reduce resource consumption. In practice, which of these reductions are employed can depend on many factors, some of which are:

user-specified frame-rates,
the decoding limits or supported encoding formats of target network display adapters,
the typical rate of change of the particular content type being encoded (for example, a web-page might only require 1 frame-per-second (fps) whereas a video might require 30 fps).
detection of actual changes to the content (for example, using a damage method to detect changes within a framebuffer or window manager such that updated video frames are only sent as required),
available network bandwidth (adapting streaming parameters based on actual measured bandwidth usage in relation to available or specified constraints),
determined processing power of the server so as to adapting streaming parameters based on actual measured CPU or GPU usage on the video-server in relation to available or specified constraints.

In one embodiment similar savings of network bandwidth and video-server compute requirements are made by reducing the resolution of the sub-images which are being streamed. For example, significant compute and bandwidth can be conserved by streaming 720p video instead of 1080p video. In this embodiment, the server streams the videos at a lower resolution than the displays are capable of handling to optimally utilize server compute and network bandwidth. The received sub-image sequences are then either scaled up by the network display adapters prior to output to the displays or scaled up by the displays themselves to match their configured resolution.

Various embodiments of this invention may use different methods to perform latency compensation. Latency compensation is required because different network display adapters can take varying amounts of time to decode, process and output a video stream. Similarly, in the situation where the network display adapter is connected to more than a simple direct-display monitor (such as an HDMI connection to a modern display), the displays themselves may add additional latency to receive and output the HDMI video signal. To ensure all displays within the video wall have sufficient time to receive and process content while keeping up with the frame-rates of their peers, a latency compensation amount should be set for each network display adapter. In its simplest form this is an offset value added by the network adapter to the presentation time stamp of individual sub-images it is to display. Regardless of its actual form, the information used to calculate the latency compensation information can be one or more of:

a user specified value (for example in a GUI, it could be specified system wide or adjusted on a per-video-wall basis), end-to-end latency measurements, expected network latency, a computer calculated value that includes that includes the worst-case decoding speeds of the network display adapters, a computer calculated value that includes information from a database of stored values for each display adapter (here for example, each display adapter might have a recorded maximum latency value that should be added into the calculation), an adapted value based on various user selections, a dynamically adapted value that adapts with varying network conditions, a dynamically adapted value that varies based on the encoding method, Various embodiments of the invention may use different methods to assign network display adapters to a video-server so that they can securely establish a connection with each other over the network. These methods include:

a unique pairing code output to the display (by directing the network display adapter to display a unique code and having the user input this code within a GUI on the server), auto-detection of the network display adapters by the server (where the server discovers, via a network device discovery protocol such as a AVAHI, the various adapters on the network and either claims them automatically or makes the discovered devices available for an administrator to claim via a GUI), calibration of multiple displays into a video-wall via an interactive GUI that includes using icon representations of each of multiple displays showing their relative position and placement.

Calibration of multiple displays into a video-wall via an automated system consisting of one or more cameras that scan the displays for oriented identifying patterns and process these inputs to determine the positioning of the displays.

In one embodiment of the invention, the network display adapter is a computing device running an operating system and the configuring of the network display adapter includes installing a software application designed to receive, decode, and synchronously output the streamed sub-image sequences to multiple displays in a video wall. This could be a generic TV box such as an android TV box and the software application being installed could be an android application potentially being installed via an app-store.

In one embodiment of the invention, the systems and methods may be expanded to include steps of authentication processing for service providers prior to arranging synchronized playback.

In one embodiment of the invention, the network-connected displays use Power-over-Ethernet (PoE) with a single cable providing both the data (Ethernet video-wall data) and power delivery to the display, eliminating the need for a power-outlet at the location of the displays.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to by terms such as "producing", "identifying", "determining", or "comparing". Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the disclosures herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, solid state drives (SSDs), network attached storage (NAS), read-only memory, random-access memory, Optical discs (CD/DVD/Blu-ray/HD-DVD), magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the operations of a method are described in a specific order, it should be understood that other operations may be performed in between described operations, described operations may be adjusted so that they occur at slightly different times or the described operations may be distributed in a system which allows the occurrence of the processing operations at various intervals associated with the processing.

While the system and method has been described in conjunction with several specific embodiments, it is evident to those skilled in the art that many further alternatives, modifications and variations will be apparent in light of the foregoing description. Thus, the embodiments described herein are intended to embrace all such alternatives, modifications, applications and variations as may fall within the spirit and scope of the appended claims.

BRIEF DESCRIPTION OF DRAWINGS

Embodiments will now be described more fully with reference to the accompanying drawings in which.

DETAILED DESCRIPTION OF DRAWINGS

These figures are representative of just one embodiment of the invention. Many other embodiments or implementations are envisioned.

Figure 1:
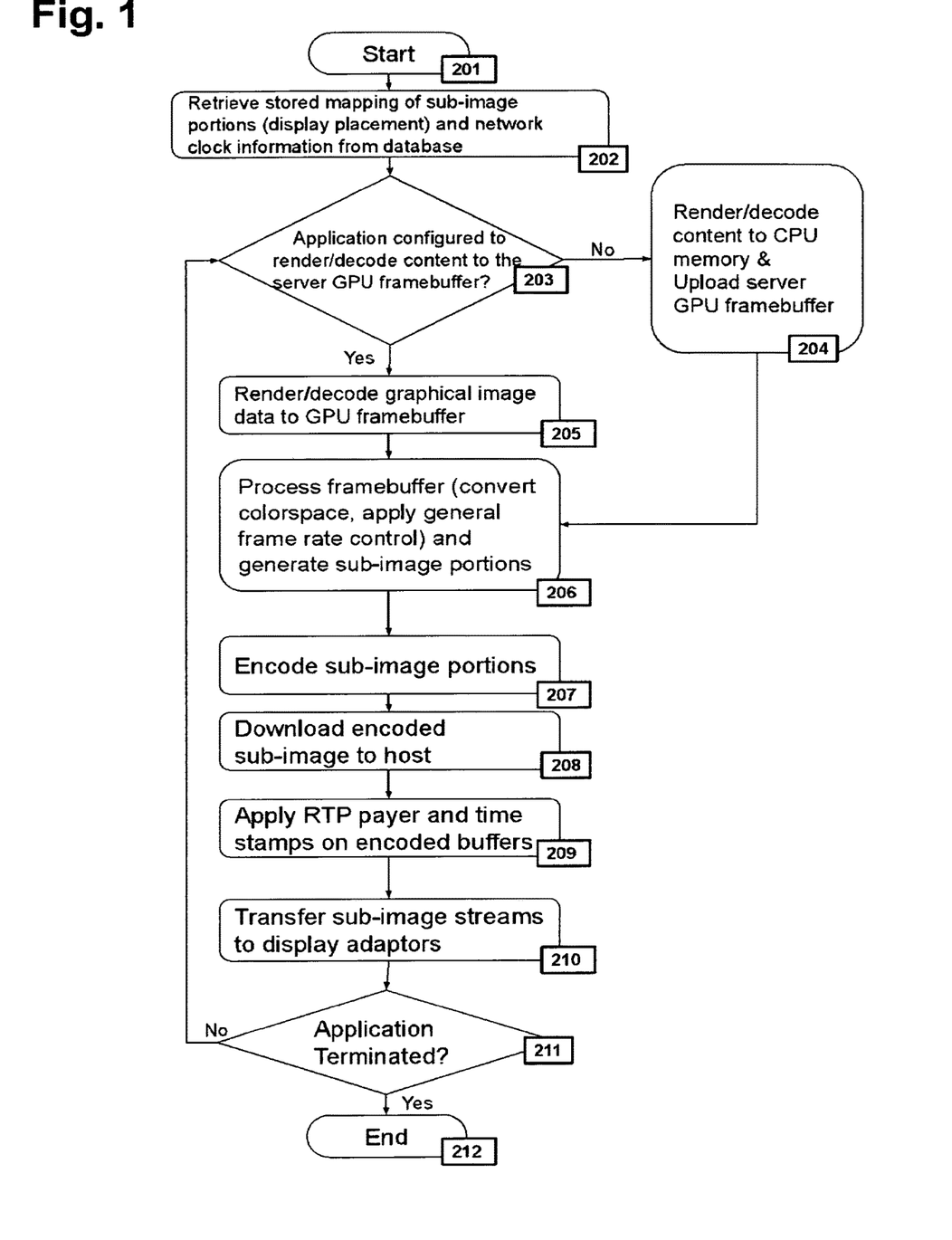
FIG. 1 is a process flow diagram of the video server processing and streamer in one embodiment of the invention.

FIG. 1 is a process flow diagram of the video server processing and streamer. At the start of the process (201) encoded frame(s) of video are presented to the video server. The server retrieves a stored mapping of sub-image portions (display placements, orientations, and capabilities) to extract from each frame, as well as network clock information (202). The server then determines if the application is configured to render or decode content directly to the server GPU framebuffer (203). If it is not so configured, it will decode a frame by CPU methods and then upload the result to the GPU framebuffer (204). If it is so configured then it will upload a frame to the GPU and use GPU methods to decode it directly to the framebuffer (205). In either case it will then process the framebuffer as configured (i.e., convert color-spaces, apply general frame rate controls) and generate sub-image portions (206). These sub-image portions are then encoded for transmission (207), and downloaded from the GPU to host CPU memory (208). RTP payer and time stamps are applied to the encoded buffers (209) and transferred over the network to the attached display adaptors (210). The server application now checks to see if it is finished processing frames (211). If not, it then repeats the process from the point at which it determines if a frame should be decoded before or after being uploaded to the GPU (203). If the application has terminated, then the process terminates (212).

Figure 2:
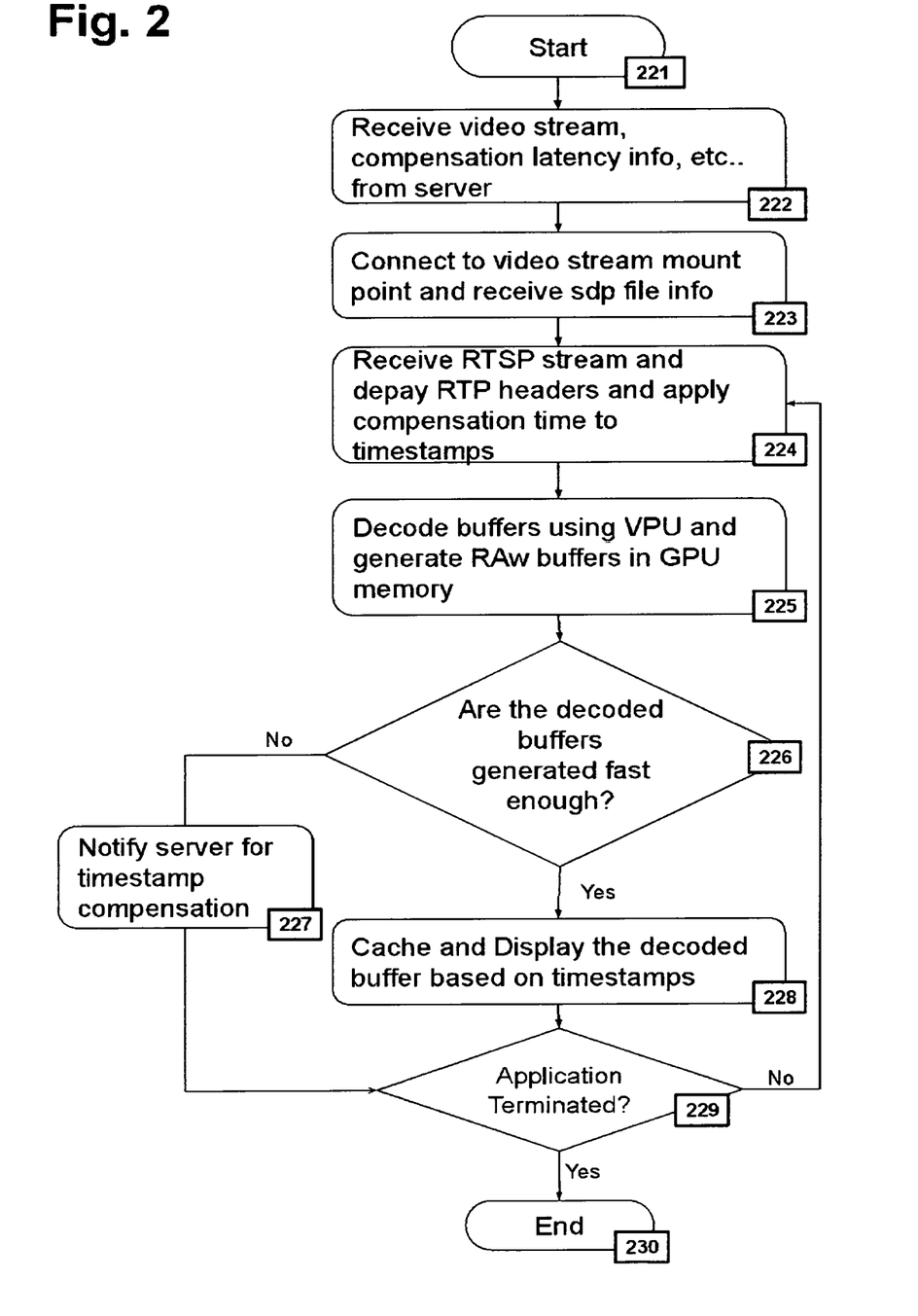
FIG. 2 is a process flow diagram of a network display adapter receiving and displaying an encoded sub-image portion in one embodiment of the invention.

FIG. 2 is a process flow diagram of a network display adaptor receiving and displaying an encoded sub-image portion. The adaptor starts by waiting for incoming network data (221). When data arrives in the form of a video stream reference and compensatory latency information (222) it can begin processing it. The adaptor will connect to a video stream mount point and receive SDP (Stream Description Protocol) information (223). This SDP information will be used to access and receive an RTSP stream, depay its RTP headers, and apply compensation time to attached timestamps (224). The buffers of the stream will then be decoded using VPU hardware and will generate raw buffers in GPU memory. At this point a measurement is taken to see if the rate at which buffers are being decoded is within configured display timing parameters (226). If not, a message is sent to the server to tell it to adjust its timestamp compensation information, and the decoded buffer is dropped (not displayed) (227). Should the buffer have been decoded within configured display timing parameters then the buffer will be cached and displayed at a moment determined by the adjusted timestamps (228). Whether or not the previous buffer was on time and displayed, or too late and discarded, the display adaptor now determines if it has finished its processing of this stream (229). If it has not finished, it repeats the process from the point at which it was reading an RTSP stream, depaying headers, and applying timestamps (224) so as to display another buffer. If the application has finished, then it proceeds to terminate the current process (230).

Figure 3:
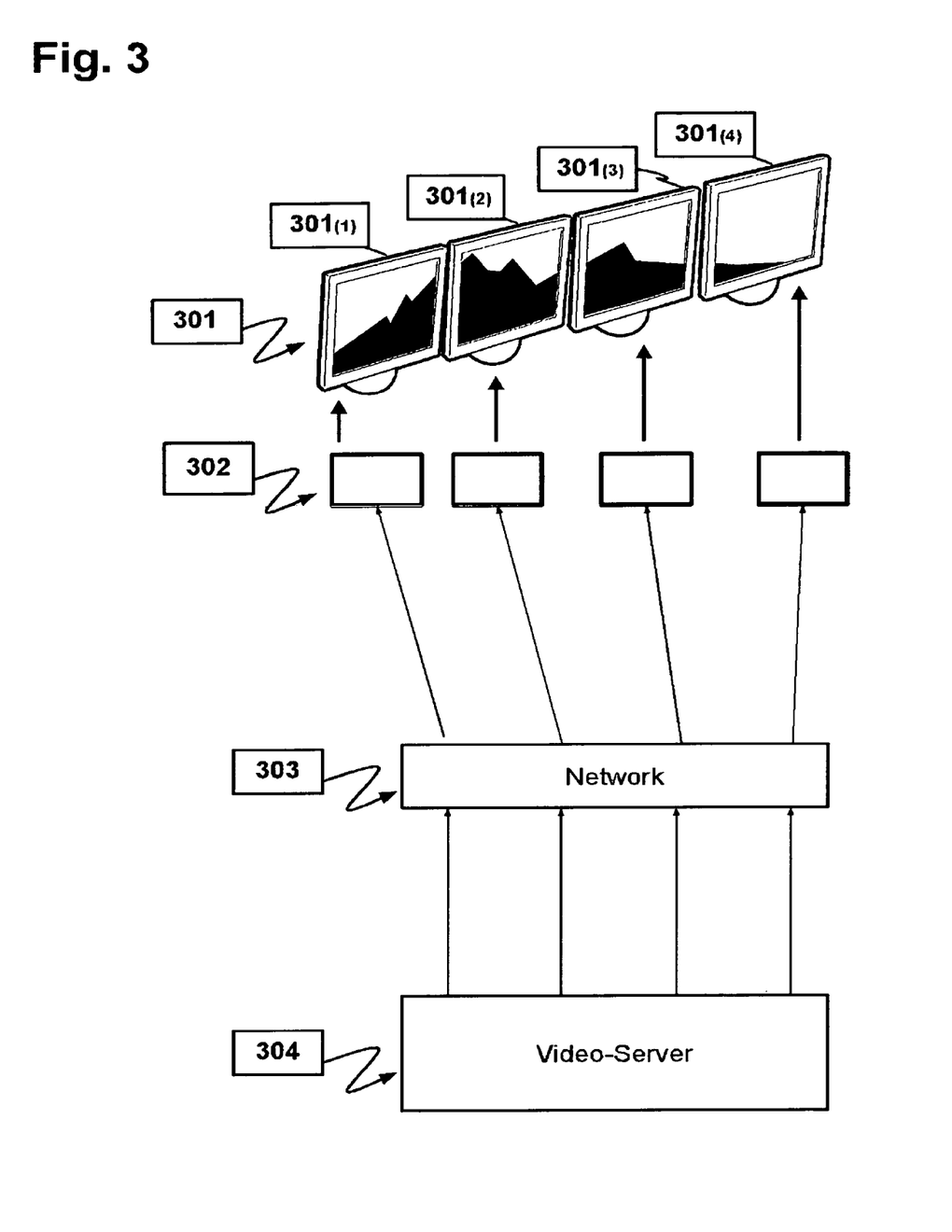
FIG. 3 is a system diagram showing the primary components of the system in a specific realization.

FIG. 3 is a system diagram showing the primary components of the system. This diagram depicts, from bottom to top, a video-server (304) sending multiple sub-image streams over a network (303). The network is shown accepting the individual sub-image streams from the video server and delivering individual sub-image streams to corresponding ones of the network display adaptors (302). Each of the individual network display adaptors is then shown outputting to the attached displays (301) arranged so as to form a video wall, the output images from each of the displays creating a unified visual canvas.

What is claimed is:

1. A system for processing and streaming sub-image portions of video content in real-time by a networked-linked video-server to multiple network-linked display adapters with network synchronized time-clocks for synchronized output to multiple displays in a video-wall, the system comprising:
    at least one graphical application being configured to render a sequence of graphical images to a server framebuffer on the networked-linked video-server;
    a processing module to extract and process from the server framebuffer, using a specified placement of the multiple displays in the video-wall, corresponding sub-image portions of the graphical images;
    a streaming module being configured to separately encode and stream the sub-image portions with matching time-stamps to their corresponding network-linked display adapters; and
    the multiple network-linked display adapters being configured to receive, decode and synchronously output the sub-image portions to corresponding individual displays within the video-wall using the matching time-stamps with timing offsets being applied that exceed the latency incurred by the receiving, decoding, and synchronously outputting.

2. The system of claim 1, wherein the streamed sub-image portions are stored on the multiple network-linked display adapters for repeated playback without re-transferring from the network-linked video-server.

3. The system of claim 1, wherein an encoding frame-rate or bit-depth of the streamed sub-image portions are varied based on changes in:
    user-specified rates,
    a processing load of the multiple network-linked display adapters,
    a determined frame-rate required by the content,
    a measured rate of change of the content,
    a determined available network bandwidth, and/or
    a determined available processing load of the server.

4. The system of claim 1, wherein the timing offsets being applied is applied by one or more of the following means:
    the network-linked display adapter adding a timing offset to the sub-image time stamps to determine a presentation time,
    the network-linked video-server adding a timing offset to a transmitted sub-image time stamps, and/or
    a network time differential between clock timings of the network-linked server and the clock timings of the network-linked display adapters being utilized to create the timing offset.

5. The system of claim 1, wherein the local timing information utilized by the network-linked display adapters is a local clock synchronized by one of:
    Network Time Protocol (NTP),
    Windows Time Service (W32Time),
    Precision Time Protocol (PTP),
    Periodic time synchronization,
    Berkeley algorithm,
    Clock-sampling mutual network synchronization,
    Cristian's algorithm,
    Global Positioning System time synchronization,
    Inter-range Instrumentation Group time codes,
    Precision Time Protocol (PTP),
    Reference broadcast synchronization (RBS),
    Reference Broadcast Infrastructure Synchronization (RBIS),
    Synchronous Ethernet,
    Synchronization in ad-hoc wireless networks,
    Data-Plane Time-synchronization Protocol,
    Data arrival time.

6. The system of claim 1, wherein the received sub-image portions are scaled by the network-linked display adapters to match an output resolution of the multiple displays prior to outputting to the multiple displays in a video-wall.

7. The system of claim 1, wherein the server-framebuffer on the network-linked video-server resides in GPU memory on the network-linked video-server and the processing is being done by the GPU on the network-linked video-server.

8. The system of claim 1, wherein a calculated timing information contains a latency offset for latency compensation which is derived from one or more of:
a user specified value,
a default value,
end-to-end latency measurements,
determined network latency,
a worst case decoding speed of the network-linked display adapter,
a worst case display speed of any display in the video wall,
database stored values based on closest matching known system configurations,
an adapted value based on user selections,
a dynamically adapted value that adapts with varying network conditions,
a dynamically adapted value that varies based on the encoding method, and/or
a dynamically adapted value based on measured latency between video-server and network-linked display adapter devices.

9. The system of claim 1, where an individual network-linked display adapter can be any one of:
a System-on-a-Chip housed within a display
a Smart display,
a stand-alone network device attached to a display via a cable,
a stand-alone network device wirelessly communicating with a display,
a TV box,
a TV stick,
a network connected zero-client device,
a wireless display,
a Personal Computer,
a Tablet,
a Cell phone,
a Smart phone,
a Holographic display,
a light emitting diode (LED) display controller,
a LED display, or
a Video projector.

10. The system of claim 1, wherein the individual displays in a video-wall can be any one of:
a video monitor,
a touch-screen display,
a front-projection display,
a rear-projection display,
an illuminated digital display,
a reflective digital display,
a LED display,
a video projector, or
a holographic display.

11. The system of claim 1, wherein a process of pairing the multiple of network-linked display adapters to the network-linked video-server includes ones of:
a unique pairing code output by each display,
auto-detection of the network-linked display adapters by the network-linked video-server,
calibration of multiple displays into the video-wall via an interactive graphical user interface (GUI) that includes using icon representations of each of multiple displays showing their relative position and placement,
calibration of multiple displays into a video-wall via a server-attached automated camera scanning for unique content sent to each display.

12. The system of claim 1, wherein the encoding of the sub-image portions includes ones of: H264, HEVC(H265), mjpeg, H263, MPEG4, Theora, 3GP, Windows Media, Quicktime, MPEG-4, VP6, VP8, VP9, MPEG1, MPEG2, MPEG-TS, MPEG-4, DNXHD, XDCAM, DV, DVCPRO, DVCPRO, DVCProHD, IMX, XDCAM HD, XDCAM HD422, XDCAM EX, JPEG, JPEG 2000, or PNG, and the transmission of the resulting streams is via one of these protocols: RTSP, Transmission Control Protocol (TCP), User Datagram Protocol (UDP), HTTP, HDS, MPEG-DASH, RTSP, RTP, RTCP, or RTMP.

13. The system of claim 1, wherein the network-linked display adapter device is a computing device running an operating system and a configuring of the network-linked display adapter includes installing a software application designed to receive, decode the streamed sub-image portions and synchronously output them to multiple displays in the video wall.

14. The system of claim 1, where the network linking the video server and the display adapters can be any one of:
a wide area network,
a local area network,
a wireless network,
an ad hoc network,
a PTP network,
an Ethernet network,
a network supplying power and signal in parallel,
a bluetooth network,
Wifi, or
802.11.

15. The system of claim 1, wherein the streaming module is configured to stream both audio and video and with some of the network-linked display adapters being configured to output audio to a speaker device.

16. The system of claim 1, wherein the system further includes video-servers comprises multiple video-servers with network-synchronized time-clocks, working together, each streaming to a different set of network-linked display adapters, enabling a larger canvas than would be possible with a single server.

17. The system of claim 1 where, the extracting of the sub-image portions by the processing module includes one or more of:
correction for monoscopic or stereoscopic VR video input,
bezel correction for output to monitors,
curvature correction for output to non-flat displays,
overlap for edge-blending for output to projectors,
keystone corrections for output to projectors,
color-space conversion to facilitate output to target network-linked display adapters,
rotation of sub-image portions to account for rotated displays,
color-correction to compensate for differences between displays, and/or
resizing or scaling of the content appropriate to the target output display size.

18. The system of claim 1, wherein the network-linked display adapters process a network-based authentication process prior to the outputting.

19. A non-transitory, tangible, computer readable medium having thereupon instructions that, when executed by at least one processor for at least one video-server network-linked to multiple time-synchronized display adapters, for synchronized output to multiple displays in a video-wall, the at least one processor is configured to perform:
- rendering, by at least one application, video data frames containing video-image pixel data at a designated resolution to a video-server framebuffer residing in a computer readable memory;
- accessing of a stored mapping of a placement of multiple displays comprising a video-wall and extracting corresponding multiple sub-images from the video-server framebuffer according to said mapping; and
- processing, encoding and streaming the multiple sub-images with matching time-stamps for synchronized output to multiple displays via the corresponding coupled network-linked display adapters being in communication with the at least one video-server;
- the multiple time-synchronized display adapters being configured to receive, decode and synchronously output the sub-image portions to corresponding individual displays within the video-wall using the matching time-stamps with timing offsets being applied that exceed the latency incurred by the receiving, decoding, and synchronously outputting.

20. A method for processing and streaming sub-image portions of real-time graphics by a network-linked video-server to multiple network-linked and time synchronized display adapters for synchronized output to multiple displays in a video-wall, the method comprising the steps of:
- rendering, by at least one graphical application being configured to render graphical image data to a server-framebuffer residing in a computer readable memory;
- extracting sub-image portions of the graphical image data from the server-framebuffer corresponding to a stored specified placement of displays within the video-wall;
- processing, sequencing, encoding with matching time-stamps, and streaming the sub-image portions with accompanying timing information to multiple corresponding network-linked display adapters;
- receiving and decoding by multiple network-linked and time synchronized display adapters the streamed sub-image sequences; and
- synchronously outputting by the multiple network-linked and time synchronized display adapters using the matching time-stamps with timing offset being applied to the corresponding displays in the video-wall the appropriate sub-images using the local and streamed timing information.

\* \* \* \* \*